US012520410B2

(12) United States Patent
Nakayama et al.

(10) Patent No.: US 12,520,410 B2
(45) Date of Patent: Jan. 6, 2026

(54) X-RAY TUBE ASSEMBLY AND X-ray CT EQUIPMENT

(71) Applicant: FUJIFILM Healthcare Corporation, Kashiwa (JP)

(72) Inventors: Kimihiro Nakayama, Kashiwa (JP); Yutaro Tanabe, Kashiwa (JP); Ren Sonoda, Kashiwa (JP)

(73) Assignee: FUJIFILM Corporation, Tokyo (JP)

( * ) Notice: Subject to any disclaimer, the term of this patent is extended or adjusted under 35 U.S.C. 154(b) by 204 days.

(21) Appl. No.: 18/218,240

(22) Filed: Jul. 5, 2023

(65) Prior Publication Data

US 2024/0105415 A1 Mar. 28, 2024

(30) Foreign Application Priority Data

Sep. 28, 2022 (JP) ................................ 2022-154672

(51) Int. Cl.
*H05G 1/02* (2006.01)
*H01J 35/18* (2006.01)

(52) U.S. Cl.
CPC ............ *H05G 1/025* (2013.01); *H01J 35/18* (2013.01); *H01J 2235/122* (2013.01); *H01J 2235/1262* (2013.01); *H01J 2235/1283* (2013.01); *H01J 2235/166* (2013.01)

(58) Field of Classification Search
CPC .... H05G 1/025; H01J 35/18; H01J 2235/122; H01J 2235/1262; H01J 2235/1283; H01J 2235/166
See application file for complete search history.

(56) References Cited

U.S. PATENT DOCUMENTS

| | | | | |
|---|---|---|---|---|
| 5,478,266 A * | 12/1995 | Kelly | H01J 33/04 445/44 |
| 6,438,208 B1 * | 8/2002 | Koller | H05G 1/025 378/140 |
| 2006/0098773 A1 * | 5/2006 | Peschmann | G01N 23/04 378/57 |

FOREIGN PATENT DOCUMENTS

JP 2002-313268 A 10/2002

OTHER PUBLICATIONS

Miyashita et al., WO 2006/009053 A1 and its English translation (Year: 2006).*

* cited by examiner

*Primary Examiner* — Chih-Cheng Kao
(74) *Attorney, Agent, or Firm* — Paul Teng

(57) ABSTRACT

A lightweight X-ray tube assembly and X-ray CT equipment having the same. The X-ray tube assembly includes an X-ray tube and a tube housing. The X-ray tube includes: a cathode for generating an electron beam; an anode for radiating X rays by collision of the electron beam; an envelope for holding the cathode and the anode in a vacuum atmosphere; and an X-ray window provided in the envelope to irradiate some of X rays radiated from the anode toward a test subject. The tube housing encapsulates the X-ray tube together with an insulating oil. The X-ray tube assembly further includes a protective member that is provided at least around the X-ray window on an outer wall of the envelope and shields the X rays.

15 Claims, 8 Drawing Sheets

D-D SECTIONAL VIEW

E-E SECTIONAL VIEW

F-F SECTIONAL VIEW
(WITHOUT DIMPLES)

F-F SECTIONAL VIEW
(WITH DIMPLES)

X-RAY TUBE ASSEMBLY AND X-ray CT EQUIPMENT

CLAIM OF PRIORITY

The present application claims priority from Japanese Patent Application JP 2022-154672 filed on Sep. 28, 2022, the content of which is hereby incorporated by reference into this application.

BACKGROUND OF THE INVENTION

The present invention relates to an X-ray tube assembly and X-ray CT (Computed Tomography) equipment and more particularly to a protective lead that is provided in an X-ray tube assembly.

X-ray CT equipment generates a tomographic image of a test subject using projection data that is obtained from many directions by rotating, around the test subject, an X-ray tube assembly for irradiating the test subject with X rays and an X-ray detector for detecting the X rays transmitted through the test subject. The generated tomographic image depicts the shape of an internal organ of the test subject and is used for diagnostic imaging. The X-ray tube assembly includes: an X-ray tube holding a cathode and an anode in a vacuum; and a tube housing for encapsulating the X-ray tube together with an insulating oil. In the X-ray tube assembly, an electron beam that is emitted from the cathode and accelerated with the high voltage applied to between the cathode and anode is made to collide against an X-ray focal spot on the anode so that X rays are radiated from the X-ray focal spot. Among the X rays radiated from the X-ray focal spot, the X rays other than those which irradiate the test subject cause ineffective exposure, so such leakage of X rays must be prevented.

Japanese Patent Unexamined Publication No. 2002-313268 discloses an X-ray tube assembly in which a protective lead to prevent leakage of X rays is attached to the inner wall of the tube housing.

However, in Japanese Patent Unexamined Publication No. 2002-313268, consideration for reduction in the weight of the X-ray tube assembly is insufficient. Specifically, since the area of the inner wall of the tube housing is relatively large, a large amount of protective lead is attached to the inner wall. Furthermore, in the recent years, as the X-ray CT equipment requires a larger amount of X rays than before, the weight of the anode tends to increase and it is thus necessary to reduce the weights of the members other than the anode.

Therefore, the present invention has an object to provide a lightweight X-ray tube assembly and X-ray CT equipment having the same.

SUMMARY OF THE INVENTION

In order to achieve the above object, according to one aspect of the invention, there is provided an X-ray tube assembly that comprises an X-ray tube and a tube housing. The X-ray tube includes: a cathode for generating an electron beam; an anode for radiating X rays by collision of the electron beam; an envelope for holding the cathode and the anode in a vacuum; and an X-ray window provided in the envelope to radiate the X rays toward a test subject. The tube housing encapsulates the X-ray tube together with an insulating oil. The assembly further comprises a protective member that is provided at least around the X-ray window on an outer wall of the envelope and shields the X rays.

According to another aspect of the invention, there is provided X-ray CT equipment that generates a tomographic image of a test subject and has the above X-ray tube assembly.

According to the present invention, it is possible to provide a lightweight X-ray tube assembly and X-ray CT equipment having the same.

DETAILED DESCRIPTION OF THE PREFERRED EMBODIMENTS

Hereinafter, the preferred embodiments of the X-ray tube assembly and X-ray CT equipment according to the present invention will be described referring to the accompanying drawings. In the explanation below and the accompanying drawings, the constituent elements with the same functions are designated by the same reference signs and repeated description thereof is omitted.

Figure 1:
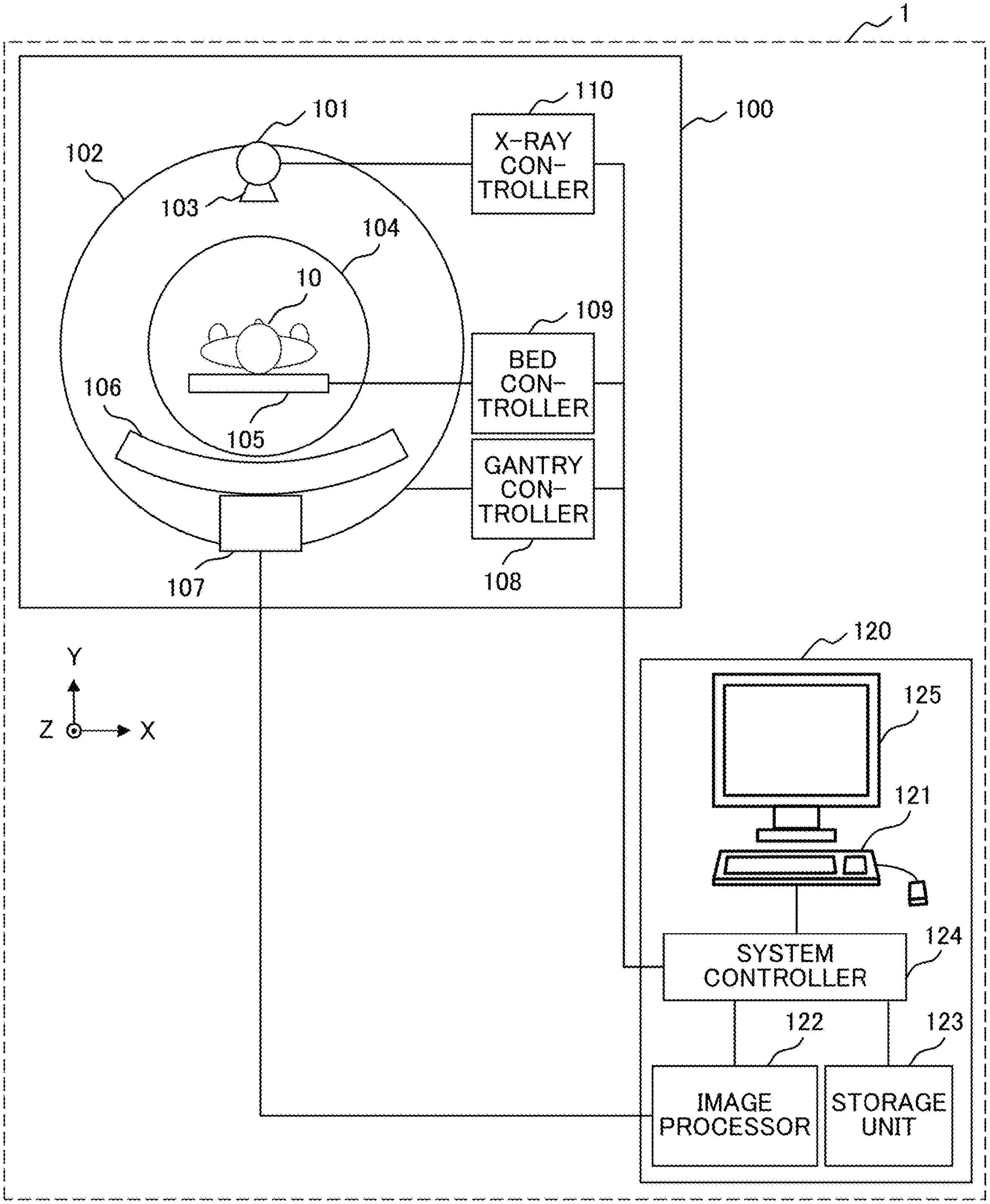
FIG. 1 is a diagram that shows the general configuration of the X-ray CT equipment.

Next, one example of the general configuration of the X-ray CT equipment 1 will be described referring to FIG. 1. The X-ray CT equipment 1 includes a scan gantry unit 100 and an operation unit 120.

The scan gantry unit 100 includes an X-ray tube assembly 101, a rotating disk 102, a collimator 103, an X-ray detector 106, a data collecting unit 107, a bed unit 105, a gantry controller 108, a bed controller 109, and an X-ray controller 110. The X-ray tube assembly 101 is a device that irradiates the test subject 10 lying on the bed unit 105 with X rays. The collimator 103 is a device that limits the range of irradiation of X rays. The rotating disk 102 has an opening 104 in which the test subject 10 lying on the bed unit 105 enters. The X-ray tube assembly 101 and X-ray detector 106 are mounted on the rotating disk 102 and the rotating disk 102 rotates the X-ray tube assembly 101 and X-ray detector 106 around the test subject 10.

The X-ray detector 106 is a device that is located in a way to face the X-ray tube assembly 101 and measures the spatial distribution of transmitted X rays by detecting the X rays transmitted through the test subject 10. The detecting elements of the X-ray detector 106 are arranged two-dimensionally in the rotation direction and rotating axis direction of the rotating disk 102. The data collecting unit 107 is a device that collects the amount of X rays detected by the X-ray detector 106 as digital data. The gantry controller 108 is a device that controls the rotation and inclination of the rotating disk 102.

The bed controller 109 is a device that controls the movement of the bed unit 105 in the vertical, front-back and left-right directions. The X-ray controller 110 is a device that controls the power inputted to the X-ray tube assembly 101.

The operation unit 120 includes an input device 121, an image processor 122, a display unit 125, a storage unit 123, and a system controller 124. The input device 121 is a device to enter the name of the test subject 10, the date of test, imaging conditions and so on and specifically it is a keyboard, pointing device, touch panel or the like. The image processor 122 is a device that performs arithmetic processing of measurement data transmitted from the data collecting unit 107 to reconstruct a CT image or performs various types of image processing for a CT image. The display unit 125 is a device that displays the CT image generated by the image processor 122 or the like and specifically it is a liquid crystal display, touch panel or the like. The storage unit 123 is a device that stores the data collected by the data collecting unit 107 and the CT image generated by the image processor 122 or the like and specifically it is an HDD (Hard Disk Drive) or the like. The system controller 124 is a device that controls various components.

The X-ray controller 110 controls the power to the X-ray tube assembly 101 according to the imaging conditions entered from the input device 121, particularly the X-ray tube voltage and X-ray tube current so that the X-ray tube assembly 101 irradiates the test subject 10 with X rays according to the imaging conditions. The X-ray detector 106 detects the X rays irradiated from the X-ray tube assembly 101 and transmitted through the test subject 10, using the two-dimensionally arranged detecting elements and measures the distribution of transmitted X rays. The rotating disk 102 is controlled by the gantry controller 108 and rotates according to the imaging conditions entered from the input device 121, particularly the rotation speed or the like. The bed unit 105 is controlled by the bed controller 109 and operates according to the imaging conditions entered from the input device 121, particularly the helical pitch or the like.

The irradiation of X rays from the X-ray tube assembly 101 and measurement of X rays by the X-ray detector 106 are repeated with rotation of the rotating disk 102 so that projection data at various angles are acquired. The acquired projection data is transmitted to the image processor 122. The image processor 122 performs back projection of the projection data at different angles as transmitted from the image processor 122 and thereby reconstructs a CT image. The reconstructed CT image is displayed on the display unit 125.

Figure 2:
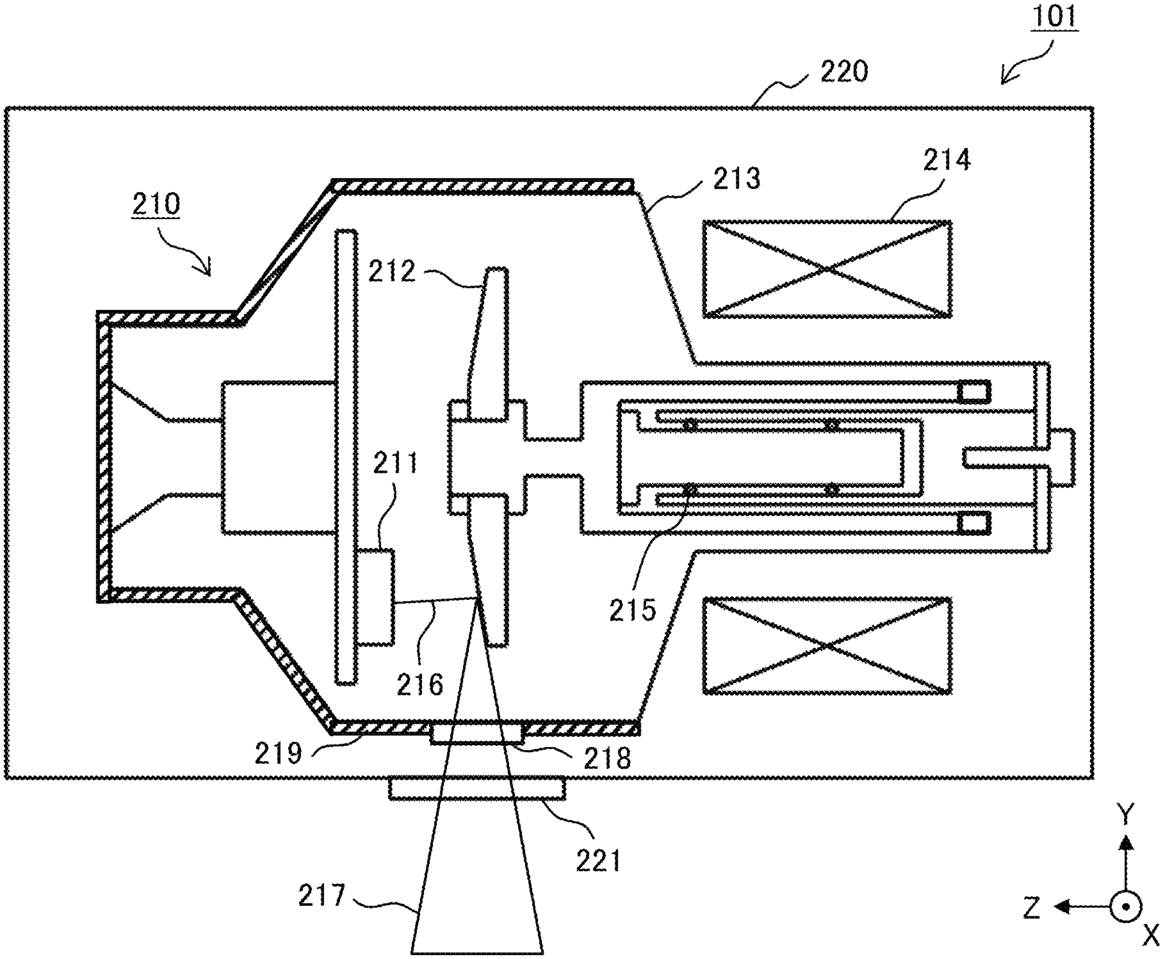
FIG. 2 is a diagram that shows one example of the general configuration of the X-ray tube assembly.

Next, one example of the general configuration of the X-ray tube assembly 101 will be described referring to FIG. 2. The X-ray tube assembly 101 includes an X-ray tube 210 for generating X rays and a tube housing 220 for encapsulating the X-ray tube assembly 101 together with an insulating oil.

The X-ray tube 210 includes a cathode 211, an anode 212, an envelope 213, and an X-ray window 218.

The cathode 211 generates an electron beam 216 and includes, for example, a filament or cold cathode and a focusing electrode. The filament is a coiled form of a material with a high melting point such as tungsten. As an electric current flows in the filament, the filament is heated and emits electrons. The cold cathode is formed by sharply steepling a metal material such as nickel or molybdenum. As electric fields concentrate on the surface of the cathode, the cathode emits electrons by field emission. The focusing electrode forms a focusing field to focus the emitted electrons onto the X-ray focal spot on the anode 212. The filament or cold cathode and the focusing electrode have the same electric potential.

The anode 212, to which a positive potential is applied with respect to the cathode 211, has, for example, a disk shape and includes a target and an anode base material. The target is made of a material which has a high melting point and a large atomic number, such as tungsten. As the electrons emitted from the cathode 211 collide against the X-ray focal spot on the target, X rays are radiated form the X-ray focal spot. The anode base material is a material with high thermal conductivity such as copper and holds the target. The target and anode base material have the same electric potential.

The envelope 213 holds the cathode 211 and anode 212 in a vacuum atmosphere in order to ensure electric insulation between the cathode 211 and anode 212. The potential of the envelope 213 is grounding potential.

The X-ray window 218 is located in the envelope 213 in order to irradiate X rays 217 as part of the X rays radiated from the X-ray focal spot, toward the test subject 10. For example, it is made of a material with a small atomic number such as beryllium. Since the electrons emitted from the anode 212 collide against the X-ray window 218, the X-ray window 218 and its vicinity are likely to have a high temperature.

The electrons emitted from the cathode 211 are accelerated by the voltage applied between the cathode 211 and anode 212 and turned into an electron beam 216. As the electron beam 216 is focused by the focusing field and collides against the X-ray focal spot on the target, X rays are radiated from the X-ray focal spot. The energy of radiated X rays is determined depending on the voltage applied between the cathode and anode, so-called tube voltage, and the X-ray dosage is determined depending on the amount of electrons emitted from the cathode, so-called tube current, and the tube voltage.

Only one percent or so of the energy of the electron beam 216 is converted into X rays and most of the remaining energy is turned into heat. In the X-ray tube assembly 101 mounted in medical X-ray CT equipment, the tube voltage is a hundred and several tens of kilovolts and the tube current is hundreds of milliamperes and thus the anode 212 is heated by tens of kilowatts of heat. In order to prevent overheating and melting due to such heating, the anode 212 may be rotatable. For example, the anode 212 is rotatably supported by a rotational bearing 215 and rotated by the magnetic field generated by an exciting coil 214 as a rotation driving force. In other words, since the rotation of the anode 212 constantly shifts the X-ray focal spot as a spot against which the electron beam 216 collides, the temperature of the X-ray focal spot can be kept at a lower level than the melting point of the target, thereby preventing the anode 212 from overheating and melting.

The tube housing 220 electrically insulates the X-ray tube 210 and encapsulates the X-ray tube 210 and exciting coil 214 together with an insulating oil which serves as a cooling medium. The insulating oil is led into a cooler through a pipe connected to the tube housing 220 and dissipates the heat in the cooler, thereafter, the insulating oil is brought back into the tube housing 220 through the pipe. In other words, the insulating oil flows from one end of the tube housing 220 to the other end thereof.

The tube housing 220 has a radiation window 221 to radiate X rays 217. Like the X-ray window 218, the radiation window 221 is made of a material with a small atomic number such as beryllium.

Since the X rays other than the X rays 217 that irradiate the test subject 10 cause ineffective exposure, a protective member 219 is further provided at least around the X-ray window 218 on the outer wall of the envelope 213 in order to shield such X rays. The protective member 219 is, for example, made of lead.

Figure 3:
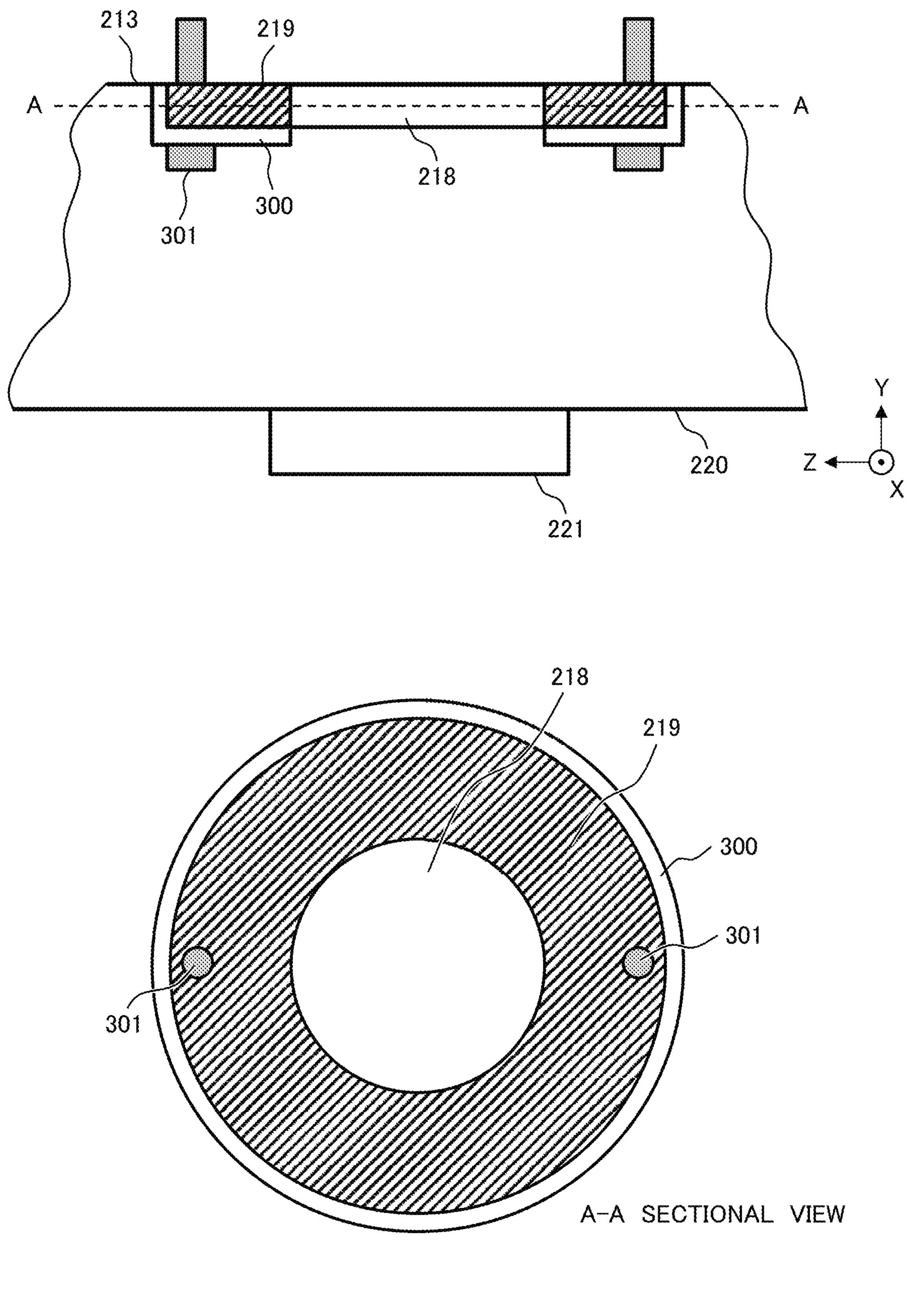
FIG. 3 is a diagram that shows one example of the structure of the protective member.

Next, one example of the structure of the protective member 219 will be described referring to FIG. 3. The protective member 219 illustrated in FIG. 3 is lead with a circular shape and located around the X-ray window 218. Since lead is a relatively soft material, it is held by a holding member 300. The holding member 300 is a SUS member with a stepped circular shape and is fixed on the envelope 213 with screws 301.

As illustrated in FIG. 3, the protective member 219 is located at least around the X-ray window 218 on the outer wall of the envelope 213, so the amount of the protective member 219 can be smaller than when it is located on the inner wall of the tube housing 220, thereby making it possible to reduce the weight of the X-ray tube assembly. It is preferable that the flow of the insulating oil should not be disturbed in the X-ray window 218 that tends to become hot and its vicinity.

Figure 4:
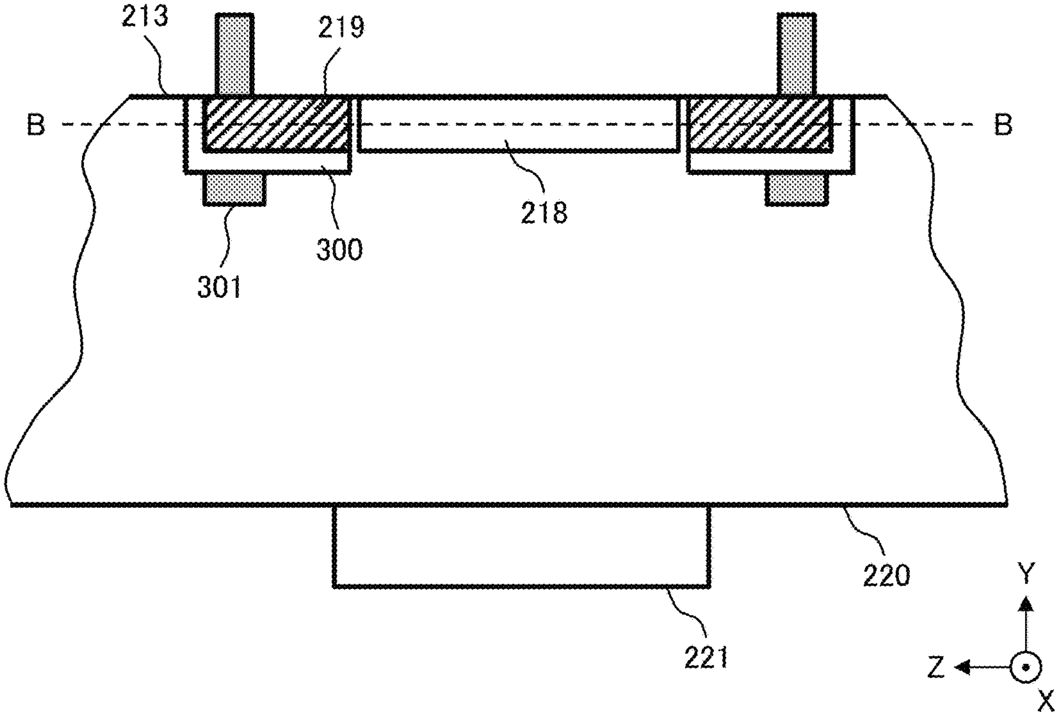
FIG. 4 is a diagram that shows one example of the structure of the protective member.
Figure 4:
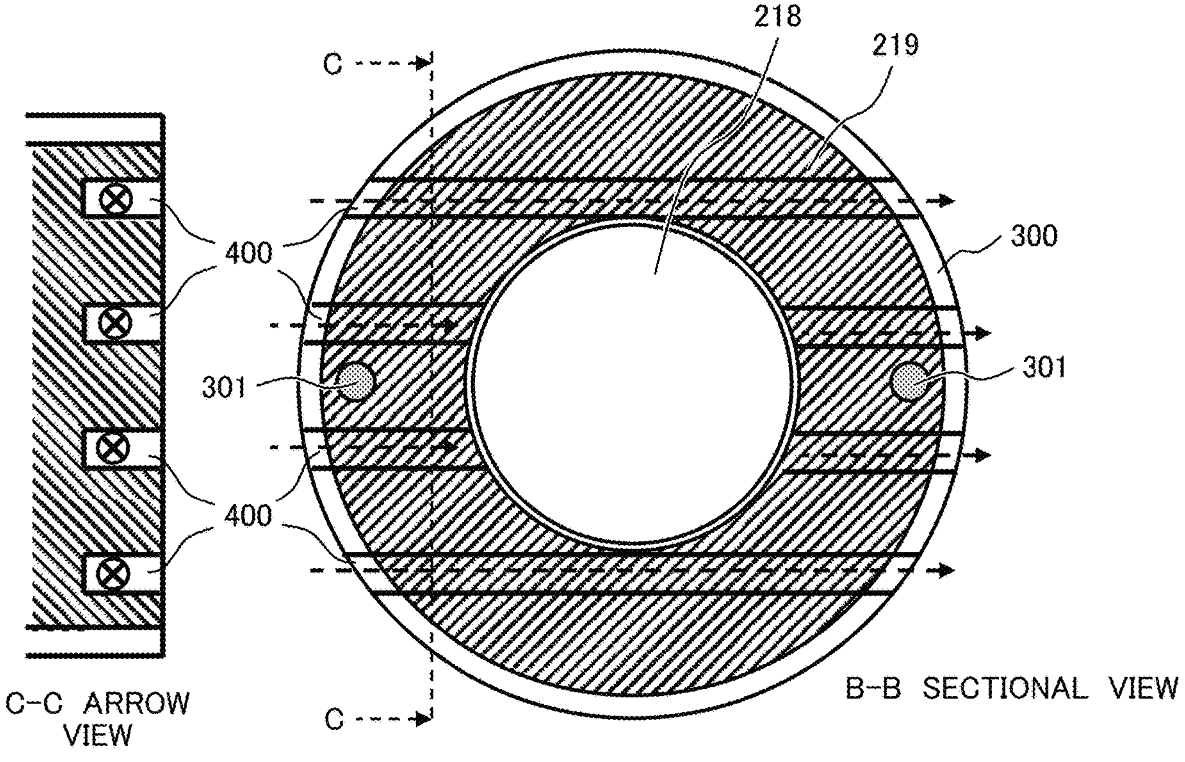

Next, one example of the structure of the protective member 219 with a flow passage in which the insulating oil flows will be described referring to FIG. 4. As in FIG. 3, the protective member 219 illustrated in FIG. 4 is lead with a circular shape that is located around the X-ray window 218 and is held by a SUS holding member 300 fixed on the envelope 213 with screws 301. In addition, the protective member 219 in FIG. 4 has a plurality of grooves 400 that function as flow passages in which the insulating oil flows, between the envelope 213 and outer wall. The insulating oil flows in the grooves 400 as indicated by the arrows shown in FIG. 4. In order not to disturb the flow of the insulating oil that hits against the X-ray window 218, a clearance is provided between the protective member 219 and X-ray window 218. Also, since reaction of the protective member 219 made of lead with the insulating oil may generate sludges which may cause discharge in oil, the surface of the protective member 219 may be varnished in order to suppress generation of sludges.

As illustrated in FIG. 4, the protective member 219 has the grooves 400 that function as flow passages for the insulating oil, so the flow of the insulating oil is not disturbed and the X-ray window 218 and its vicinity can be cooled. The flow passages for the insulating oil are not limited to the grooves 400.

Figure 5:
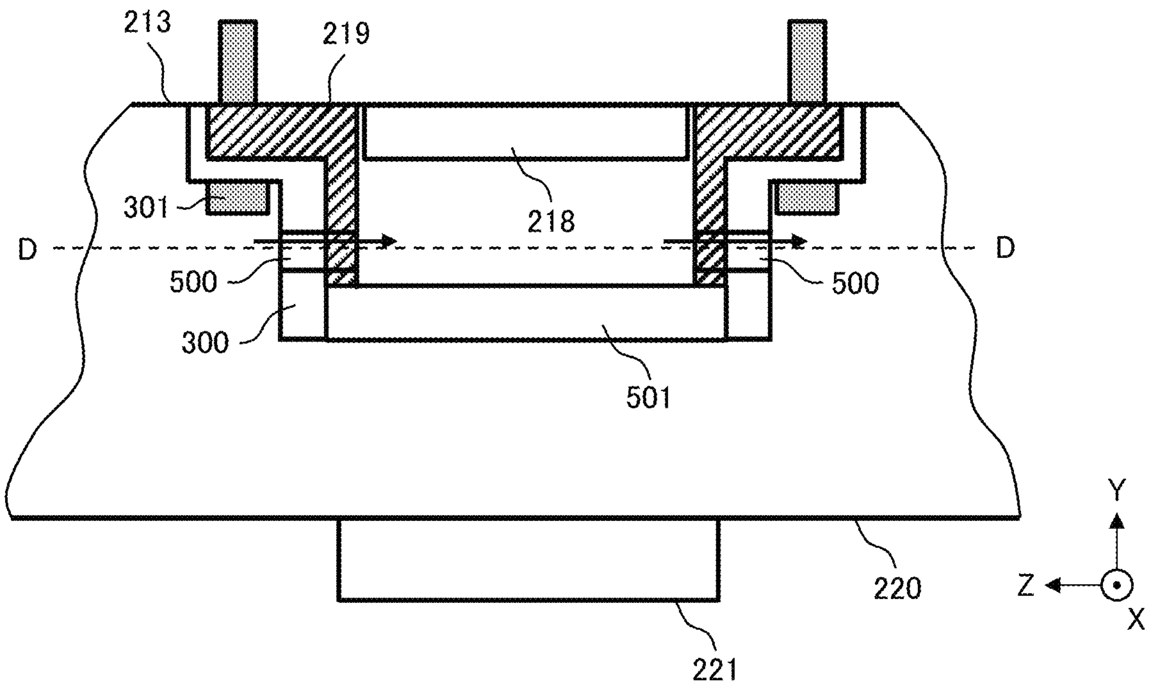
FIG. 5 is a diagram that shows one example of the structure of the protective member.
Figure 5:
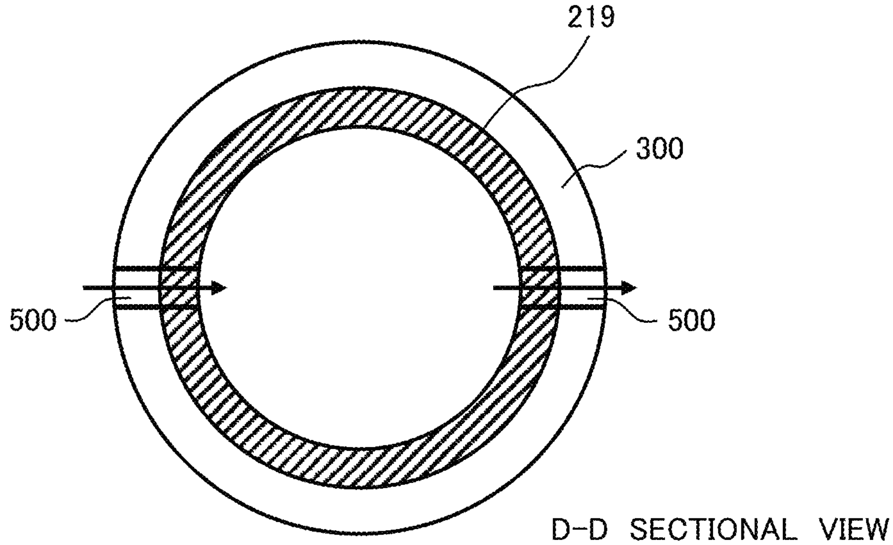

Next, another example of the structure of the protective member 219 with a flow passage for the insulating oil will be described referring to FIG. 5. The protective member 219 illustrated in FIG. 5 is lead with a fringed cylindrical shape and located around the X-ray window 218 and held by a holding member 300. The holding member 300 in FIG. 5 is a SUS member with a shape that covers the outer wall of the protective member 219 and is fixed on the envelope 213 with screws 301. A pair of holes 500 that function as a flow passage in which the insulating oil flows are made in the side faces of the protective member 219 and holding member 300 in parallel with the flow of the insulating oil that flows from one end of the tube housing 220 to the other end thereof. As indicated by the arrows in FIG. 5, the insulating oil flows in from one of the holes 500 and absorbs the heat on the surface of the X-ray window 218, and thereafter flows out from the other hole 500. In order to ensure that the insulating oil smoothly flows on the surface of the X-ray window 218, a beryllium plate 501 may be provided at the lower end of the holding member 300.

As illustrated in FIG. 5, the holes 500 that function as a flow passage for the insulating oil are provided in the side faces of the protective member 219 and holding member 300, so the flow of the insulating oil is not disturbed and the X-ray window 218 and its vicinity can be cooled. The form of the holes 500 is not limited to the form shown in FIG. 5.

Figure 6:
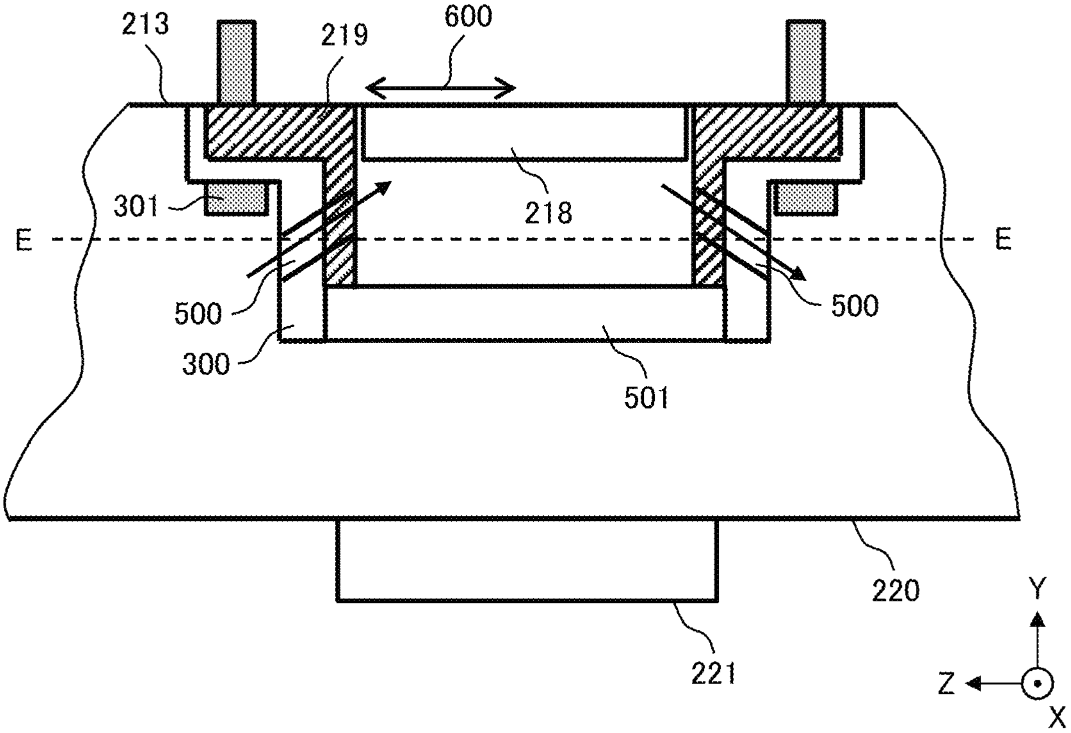
FIG. 6 is a diagram that shows one example of the structure of the protective member.
Figure 6:
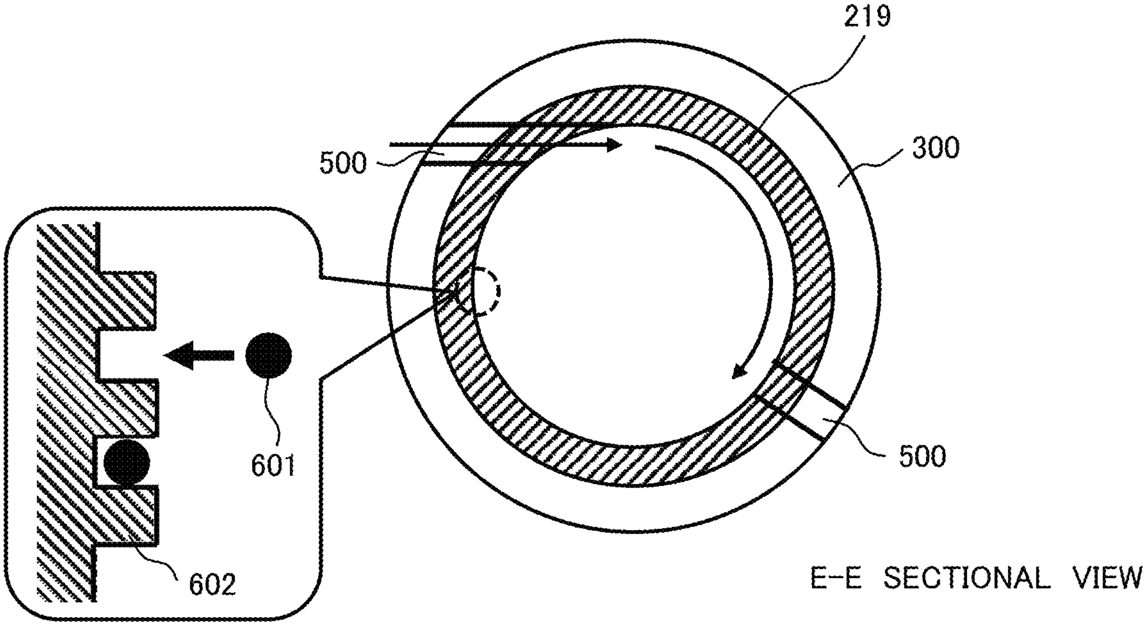

Next, another example of the structure of the protective member 219 with a flow passage for the insulating oil will be described referring to FIG. 6. As in FIG. 5, the protective member 219 illustrated in FIG. 6 is lead with a fringed cylindrical shape and located around the X-ray window 218 and held by a SUS holding member 300 that is fixed on the envelope 213 with screws 301. A pair of holes 500 that function as a flow passage in which the insulating oil flows are made in the side faces of the protective member 219 and holding member 300 in FIG. 6. However, the holes 500 are inclined with respect to the surface of the X-ray window 218 so that the insulating oil flowing in from the hole 500 is led to the surface opposite to an electron collision area 600 as an area where the electrons emitted from the anode 212 collide against the X-ray window 218. More specifically, the hole 500 is inclined so that the extended line of the center axis of the hole 500 intersects with the surface opposite to the electron collision area 600.

As illustrated in FIG. 6, the holes 500 made in the side faces of the protective member 219 and holding member 300 are inclined with respect to the surface of the X-ray window 218 and thus the insulating oil is led to the surface opposite to the electron collision area 600 so that the X-ray window 218 is cooled more effectively.

Even if the surface of the lead protective member 219 is varnished, a small amount of sludge may be generated and adhere to the surface of the X-ray window 218. The sludge adhering to the surface of the X-ray window 218 may hamper cooling of the X-ray window 218 and also cause noise in an X-ray image, so it is desirable to suppress the adhesion of sludges to the surface of the X-ray window 218.

Next, the protective member 219 that suppresses the adhesion of sludges to the surface of the X-ray window 218 will be described referring to the sectional view taken along the line E-E of FIG. 6. The hole 500 illustrated in the sectional view taken along the line E-E is made so that the insulating oil swirls along the inside surface of the cylindrical protective member 219. More specifically, the hole 500 is made not only in parallel with the flow of the insulating oil flowing from one end of the tube housing 220 to the other end, but also in a way to be in contact with the inside surface of the protective member 219 at the point where the insulating oil flows into the protective member 219.

As illustrated in the sectional view taken along the line E-E of FIG. 6, the hole 500 is provided so that the insulating oil swirls along the inside surface of the cylindrical protective member 219, and due to the centrifugal force generated by swirling of the insulating oil, a sludge 601 adheres to the inside surface of the protective member 219. As a consequence, the sludge 601 does not adhere to the surface of the X-ray window 218.

The protective member 219 may have a corrugated portion 602 with almost the same width and depth as the average grain size of the sludge 601 or 5 μm, on its inside surface. Due to the existence of the corrugated portion 602 on the inside surface of the protective member 219, the sludge 601 adhering to the inside surface of the protective member 219 due to the centrifugal force fits into the corrugated portion 602, and does not flow into the insulating oil again.

Next, another example of the structure of the area around the X-ray window 218 will be described referring to FIG. 7.

Figure 7:
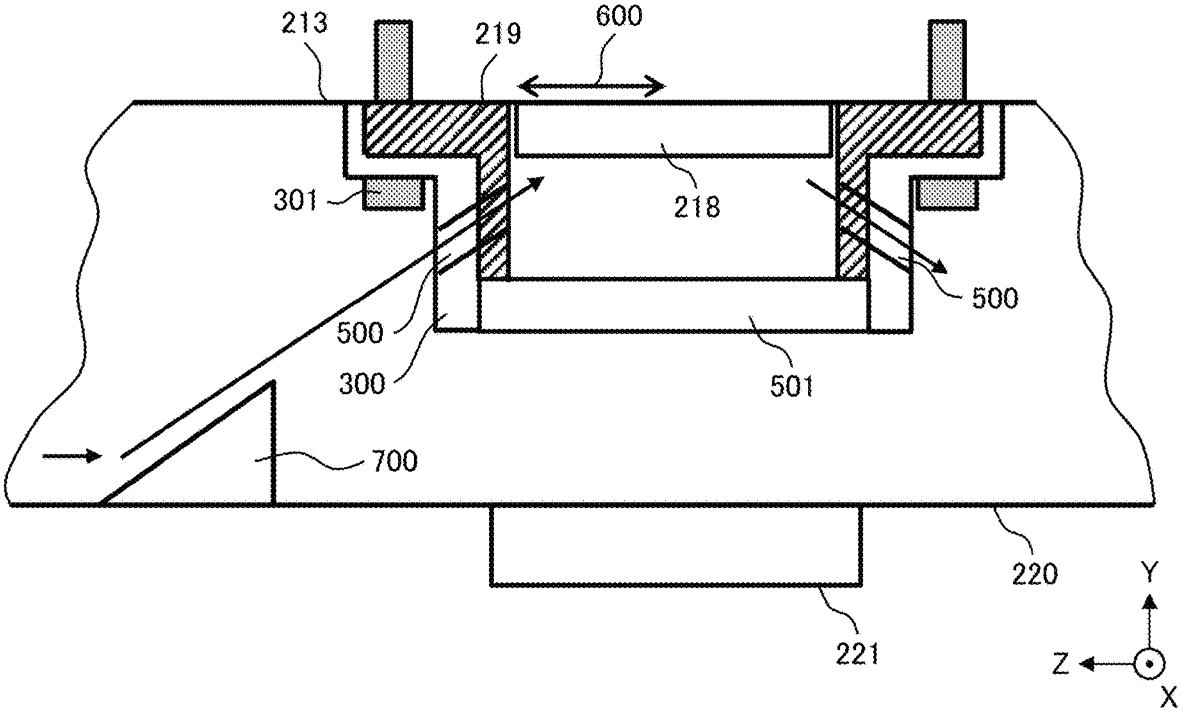
FIG. 7 is a diagram that shows one example of the structure of the area around the X-ray window.

As in FIG. 6, a protective member 219 with a hole 500 inclined with respect to the surface of the X-ray window 218 is provided around the X-ray window 218 illustrated in FIG. 7. In addition, a slope 700 to lead the insulating oil toward the hole 500 is provided on the inner wall of the tube housing 220. More specifically, a slope 700 with an inclined surface along the extended line of the center axis of the hole 500 is provided.

Due to the existence of the slope 700 illustrated in FIG. 7, the insulating oil is smoothly led into the hole 500 inclined with respect to the surface of the X-ray window 218 and thus the X-ray window 218 can be cooled more effectively.

Figure 8:
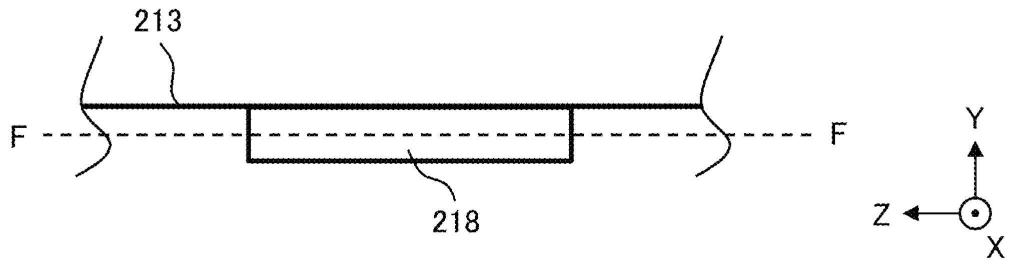
FIG. 8 is a diagram that shows one example of the structure of the area around the X-ray window.
Figure 8:
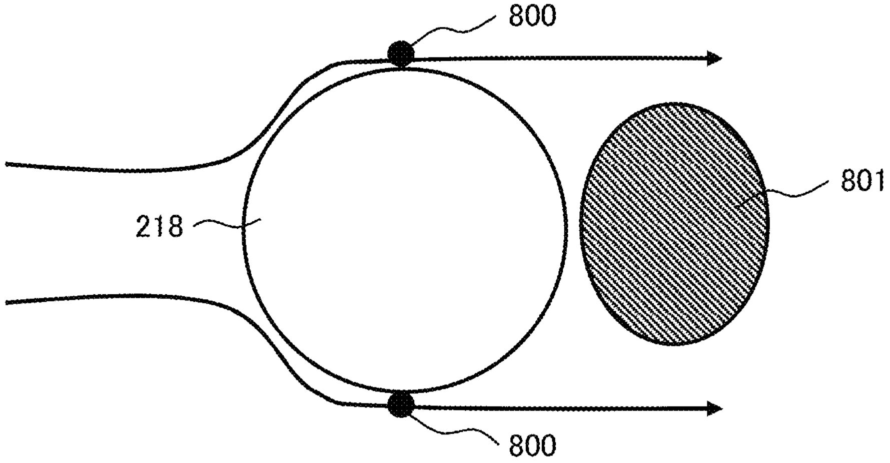
Figure 8:
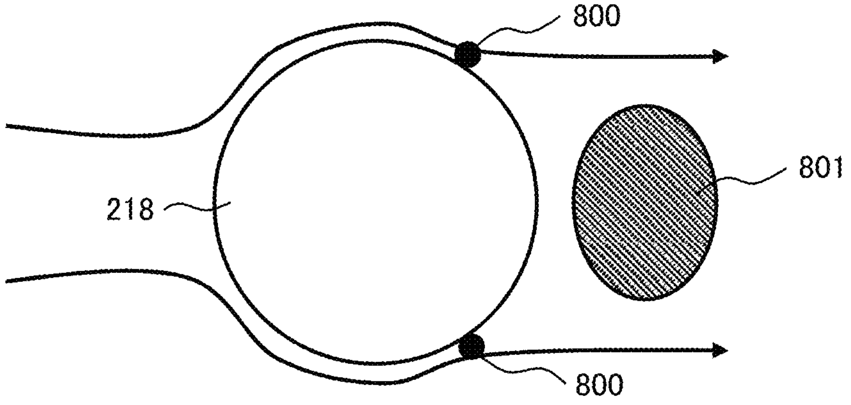

Next, another example of the structure of the area around the X-ray window 218 will be described referring to FIG. 8. The X-ray window 218 illustrated in FIG. 8 has a dimple formed on its outside surface. If there is no dimple on the outside surface of the X-ray window 218, the separation point 800 at which the insulating oil separates from the outside surface of the X-ray window 218 is the point at which the flow of the insulating oil and the outside surface of the X-ray window 218 are parallel to each other, and a stagnation area 801 as an area where the insulating oil stagnates is relatively large. On the other hand, if there is a dimple on the outside surface of the X-ray window 218, the separation point 800 shifts more downstream than when there is no dimple and as the separation point 800 shifts, the stagnation area 801 becomes smaller and thus the X-ray window 218 and its vicinity can be cooled more effectively.

The preferred embodiments of the present invention have been so far described. The present invention is not limited to the above embodiments, but the constituent elements can be embodied in modified forms without departing from the gist of the invention. Some of the constituent elements disclosed in the above embodiments may be combined as appropriate. For example, the protective member 219 illustrated in FIG. 5 or FIG. 6 may have the grooves 400 illustrated in FIG. 4. Furthermore, among all the constituent elements described in the above embodiments, some constituent elements may be omitted.

REFERENCE SIGNS LIST

1: X-ray CT equipment
10: test subject
100: scan gantry unit
101: X-ray tube assembly
102: rotating disk
103: collimator
104: opening
105: bed unit
106: X-ray detector
107: data collecting unit
108: gantry controller
109: bed controller
110: X-ray controller
120: operation unit
121: input device
122: image processor
123: storage unit
124: system controller
125: display unit
210: X-ray tube
211: cathode
212: anode
213: envelope
214: exciting coil
215: rotational bearing
216: electron beam
217: X ray
218: X-ray window
219: protective member
220: tube housing
221: radiation window
300: holding member
301: screw
400: groove
500: hole
201: beryllium plate
600: electron collision area
601: sludge
602: corrugated portion
700: slope
800: separation point
801: stagnation area

What is claimed is:

1. An X-ray tube assembly comprising:
an X-ray tube that includes:
a cathode for generating an electron beam;
an anode for radiating X rays by collision of the electron beam;
an envelope for holding the cathode and the anode in a vacuum atmosphere; and
an X-ray window provided in the envelope to irradiate some of the X rays radiated from the anode toward a test subject;
a tube housing for encapsulating the X-ray tube together with an insulating oil; and
a protective member that is provided at least around the X-ray window on an outer wall of the envelope and shields the X rays, wherein
the protective member has a flow passage in which the insulating oil flows, and the flow passage is a hole to lead the insulating oil to a surface of the X-ray window, and
the protective member has a cylindrical shape to cover a circumference of the X-ray window, and the hole is located so as to make the insulating oil swirl along an inside surface of the protective member.

2. The X-ray tube assembly according to claim 1, wherein the hole is inclined with respect to the X-ray window so as to lead the insulating oil to a surface opposite to an area where electrons emitted from the anode collide against the X-ray window.

3. The X-ray tube assembly according to claim 2, further comprising a slope to lead the insulating oil to the hole.

4. The X-ray tube assembly according to claim 1, wherein minute concaves and convexes are formed on the inside surface of the protective member.

5. The X-ray tube assembly according to claim 1, wherein the flow passage is a groove for the insulating oil to flow between an outer wall of the envelope and the protective member.

6. X-ray CT equipment that generates a tomographic image of a test subject and comprises the X-ray tube assembly according to claim 1.

7. An X-ray tube assembly comprising:
an X-ray tube that includes:
a cathode for generating an electron beam;
an anode for radiating X rays by collision of the electron beam;
an envelope for holding the cathode and the anode in a vacuum atmosphere; and an X-ray window provided in the envelope to irradiate some of the X rays radiated from the anode toward a test subject;

a tube housing for encapsulating the X-ray tube together with an insulating oil; and a protective member that is provided at least around the X-ray window on an outer wall of the envelope and shields the X rays, wherein a dimple is formed on an outside surface of the X-ray window, and the outside surface is parallel to the X rays that irradiate the test subject.

8. X-ray CT equipment configured to generate a tomographic image of a test subject, the X-ray CT equipment comprising the X-ray tube assembly according to claim 7.

9. The X-ray tube assembly according to claim 7, wherein the protective member has a flow passage in which the insulating oil flows.

10. The X-ray tube assembly according to claim 9, wherein the flow passage is a hole to lead the insulating oil to a surface of the X-ray window.

11. The X-ray tube assembly according to claim 10, wherein the hole is inclined with respect to the X-ray window so as to lead the insulating oil to a surface opposite to an area where electrons emitted from the anode collide against the X-ray window.

12. The X-ray tube assembly according to claim 10, further comprising a slope to lead the insulating oil to the hole.

13. The X-ray tube assembly according to claim 10, wherein the protective member has a cylindrical shape to cover a circumference of the X ray window, and the hole is located so as to make the insulating oil swirl along an inside surface of the protective member.

14. The X-ray tube assembly according to claim 13, wherein minute concave and convex portions are formed on the inside surface of the protective member.

15. The X-ray tube assembly according to claim 9, wherein the flow passage is a groove for the insulating oil to flow between an outer wall of the envelope and the protective member.

* * * * *